June 10, 1924.
W. F. KRAUTTER
LOCK
Filed June 3, 1921
1,496,894
2 Sheets-Sheet 1
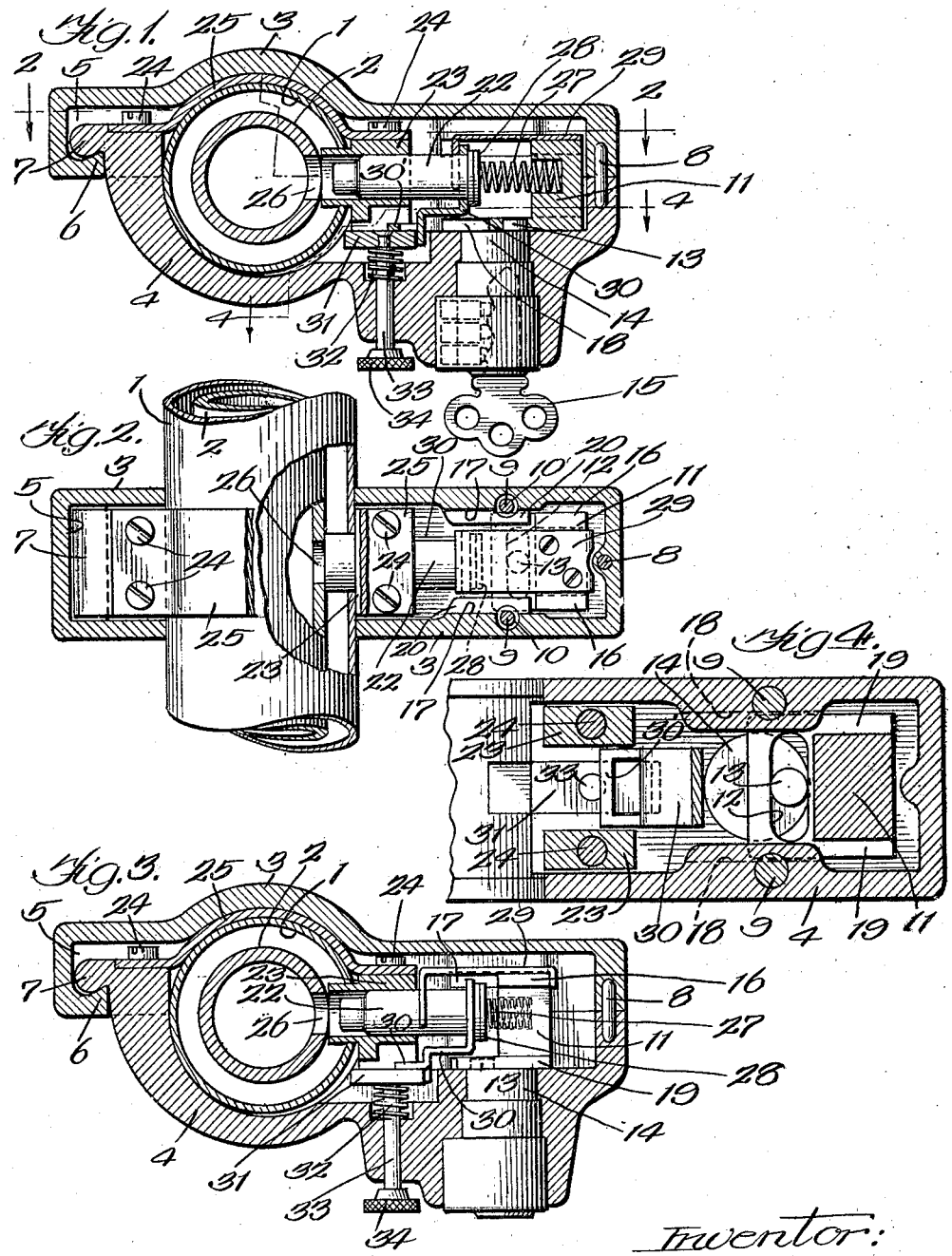

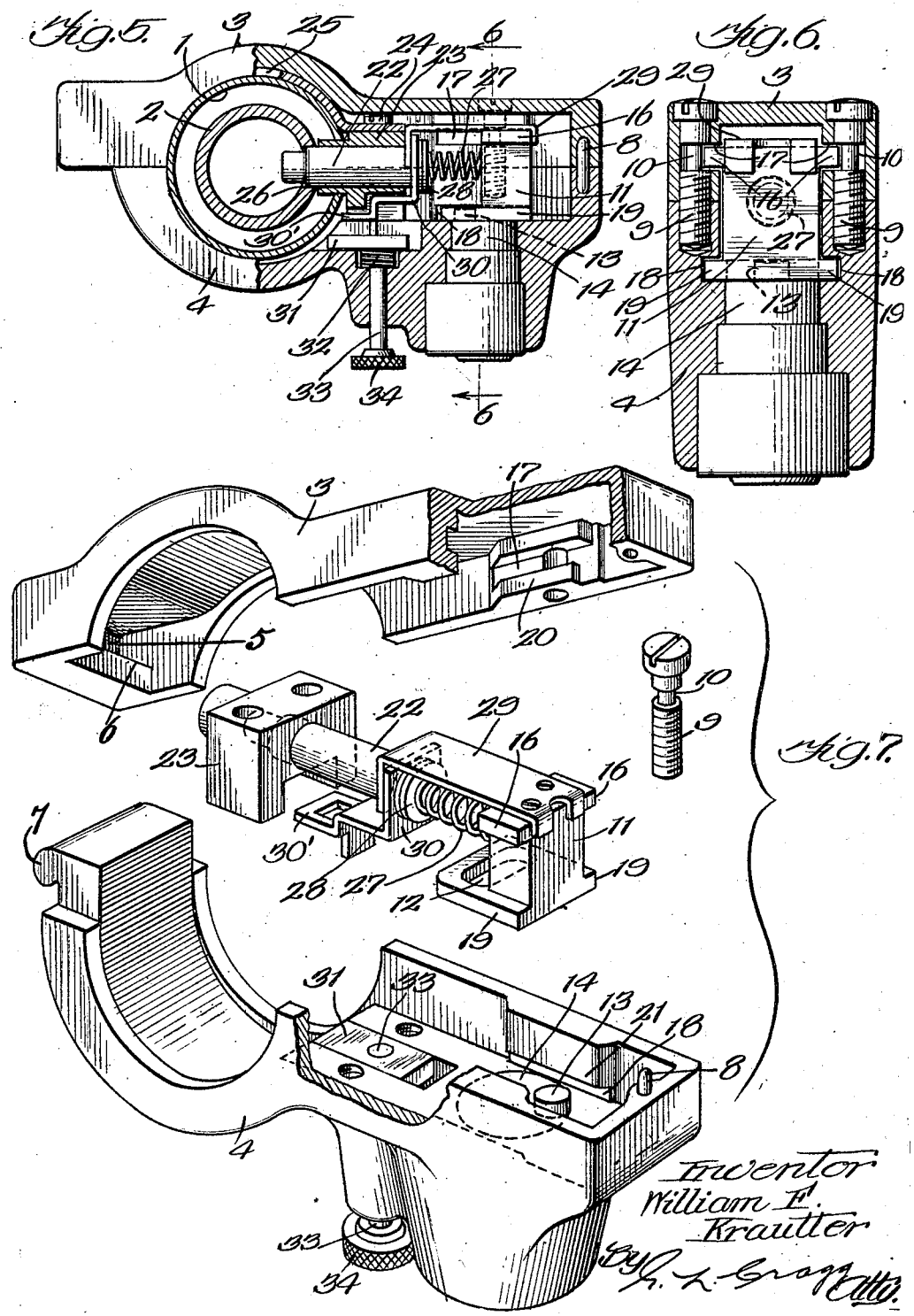

Patented June 10, 1924.

1,496,894

UNITED STATES PATENT OFFICE.

WILLIAM F. KRAUTTER, OF CHICAGO, ILLINOIS, ASSIGNOR OF ONE-HALF TO WILLIAM D. KRAUTTER, OF CHICAGO, ILLINOIS.

LOCK.

Application filed June 3, 1921. Serial No. 474,681.

*To all whom it may concern:*

Be it known that I, WILLIAM F. KRAUTTER, citizen of the United States, residing at Chicago, in the county of Cook and State of Illinois, have invented a certain new and useful Improvement in Locks, of which the following is a full, clear, concise, and exact description.

My invention relates to locks and is of particular service when employed for the purpose of locking the steering post of an automobile against rotation to guard against theft, although the invention is not to be limited to any particular use to which it is put.

The invention, in one of its characteristics, comprises the bolt of the lock, a spring for pressing the bolt into one of its positions, a bolt positioning member serving to place the bolt in its other position, a restraining member for holding the bolt in its latter position against the force of said spring, and a detent for holding the restraining member in functioning position.

The invention, in another of its characteristics, relates to a two part casing that employs a lock for holding the two parts of the casing together. In one embodiment of this feature of my invention a screw is employed for holding the two parts of the casing together, the lock being adjustable into and out of holding relation with the screw to prevent or permit the turning of the screw. In another embodiment of this feature of my invention the lock projects into recesses that are formed upon the two casing parts, these recesses desirably forming ribs upon the two casing sections, the outer faces of said ribs being engaged by the lock, in one adjustment thereof, to hold the casing sections together, these outer faces of the ribs being free of engagement with the lock, in another adjustment of the lock, to permit the casing sections to be separated.

I will explain my invention more fully by reference to the accompanying drawings showing the preferred embodiment thereof and in which Fig. 1 is a sectional plan view of the lock as employed in association with the steering post and column of an automobile; Fig. 2 is a sectional view on line 2—2 of Fig. 1; Fig. 3 is a view similar to Fig. 1 showing some of the parts in another adjustment; Fig. 4 is a sectional view on line 4—4 of Fig. 1; Fig. 5 is a view generally similar to Fig. 1 but showing parts in another adjustment; Fig. 6 is a sectional view on line 6—6 of Fig. 5; and Fig. 7 is a perspective view of the structure with parts thereof shown in separated relation.

Like parts are indicated by similar characters of reference throughout the different figures.

The lock of my invention is shown in association with the stationary steering column 1 and the rotatable steering post 2 of an automobile. The casing of the lock is clamped upon the stationary steering column, and in order that it may be readily applied thereto, the casing is formed into two sections 3 and 4. The casing section 3 is formed with a recess 5 that is margined by a lip 6. The casing section 4 is formed with a lip 7 that interengages with the lip 6 when the casing sections are assembled. A dowel pin 8 is at the other end of the casing and takes part in maintaining the casing sections in proper relation when the casing is closed. Screws 9 are freely slipped through the casing section 3 into threaded connection with the casing section 4. The heads of said screws press upon the casing section 3 so that said screws directly engage and hold both casing parts together. The portions of these screws that do not extend into the casing section 4 are formed with annular channels 10 in their sides. A locking member 11 is formed with a slot 12 that receives a pin 13 eccentrically disposed upon a key actuated cylindrical element 14, this key actuated element being mounted in the casing section 4 and constructed in any suitable way to provide key controlled means whereby the element 14 may only be turned in response to the operation of a key 15, and as such key controlled means forms no novel part of my present invention and may have a variety of embodiments it will not be further described. The element 11 is thus, itself, in the nature of a bolt and is formed with flanges 16 that enter the screw channels 10 when the parts of the casing are to be locked together so that the screws 9 may not then be turned to effect their withdrawal.

When the parts of the casing are to be unlocked to permit of their separation the bolt 11 is withdrawn to remove its flanges 16 from the screw channels 10 to permit said screws to be unscrewed. The casing sections are further locked together by providing therein two recesses 17 and 18 into and out of at least one of which the corresponding flange 16 or 19 upon the bolt 11 is passed when the member 14 is turned to locking position or to an unlocking position respectively. Ribs 20 and 21 are formed as a consequence of the formation of said recesses 17 and 18, these ribs being respectively in the casing sections 3 and 4. Portions 16 and 19 of the bolt 11, when this bolt is thrown to a locking position, engage the outer faces of said ribs to hold the sections of the casing together. While the casing is preferably formed as described, I do not wish to be limited to such a construction, in carrying out the balance of my invention.

The bolt proper or main bolt 22 is arranged to slide back and forth within a holding sleeve 23 that is suitably assembled with the casing section 4 to which the sleeve is secured, by means of screws 24 passing through the strap 25 and into the casing section 4. The bore of the sleeve is in register with an opening 26 formed in the rotatable steering post 2. The screws 24 serve to clamp the stationary steering column 1 between the casing section 4 and the strap 25, the screws 9 supplementing the screws 24 in this function.

A bolt throwing coiled spring 27 is held at its outer end in a recess in the key actuated bolt 11 and at its inner end engages the head 28 upon the outer end of the main bolt 22. When this spring is adjusted to and is free to perform its function it presses the main bolt 22 inwardly to cause it to enter the opening 26 in the steering post 2 when the steering post is suitably positioned, as indicated in Fig. 5. The spring 27, in order that it may perform its function, is bodily inwardly adjusted by the key actuated member 14 when this member is turned to locking position by the key 15. If this spring, having been bodily moved toward the steering post 2 by the inward movement of the bolt 11, is free to perform its function by other mechanism that is hereinafter to be set forth, it will throw the bolt 22 into locking position and into indirect engagement with the inturned end of the bolt withdrawing or positioning member 29 that is mounted upon the bolt 11 that is directly actuated by the element 13 upon the key actuated member 14, this member 20 thus being a key actuated member. When the main bolt 22 is to be drawn from its locking position the other bolt 11 is turned by the key 15 whereupon the withdrawing or positioning member 29 moves the bolt 22 outwardly, the spring 27 then bodily moving with said withdrawing member 29 and the bolt 11, the spring not then functioning. A restraining member 30 is interposed between the inturned end of the key actuated withdrawing member 29 and the bolt head 28, this restraining member holding the bolt 22 in the outward position in which it is placed by the withdrawing member 29 when the restraining member itself is held as will be described. The restraining member is held in its functioning position by a detent 31. A coiled spring 32 serves to place the detent 31 in position to hold the restraining member 30 when the bolt has been withdrawn to its outer or unlocking position, the restraining member 30 being also withdrawn to its outward position at the same time by the key actuated member 29. The spring effected movement of the detent 31 is desirably limited by the projection 30' formed upon the restraining member 30. When the restraining member 30 is held by the detent 31 in functioning position, the locking member 14 may be turned to locking position, as illustrated in Fig. 3, without permitting the spring 27 to function, the spring being then placed under increased compression owing to the fact that the bolt 11 is forced toward the held bolt 22. The key 15 may then be withdrawn from the lock and need not again be inserted in order that the main bolt 22 may be placed in locking position as I have provided means whereby the detent 31 may be withdrawn from engagement with the restraining member 30 to permit the spring 27 to distend from its compressed adjustment shown in Fig. 3 to its distended form shown in Fig. 5, the spring 27, when thus released, alone serving to place the bolt 22 in locking position without the aid of the key. In order that the detent 31 may be released so that the spring 27 may place the bolt 22 in locking position, I mount said detent upon a rod 33 that is slidably mounted in the casing section 4, this rod having a knurled head 34 upon the exterior of said casing section whereby the rod may be pulled outwardly to move the detent 31 outwardly from the position shown in Fig. 3 against the force of the detent spring 32 into the position shown in Fig. 5.

Features of novelty not herein claimed form the subject matter of a division of this application Serial No. 608,787, filed Dec. 23, 1922.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a two part casing having ribs on the two parts thereof and within the casing; of a lock inclusive of a bolt in engagement with the outer faces of said ribs in one adjustment of the bolt and free of engagement with the outer faces of said ribs in another adjustment of the bolt.

2. The combination with a two part casing having ribs on the two parts thereof and within the casing; of a lock inclusive of a bolt in engagement with the outer faces of said ribs in one adjustment of the bolt and free of engagement with the outer face of one of said ribs in another adjustment of the bolt.

3. The combination with a two part casing; of a screw threaded into one of the casing parts and engaging both casing parts for directly holding the two parts of the casing together and formed with an annular groove; and a lock that is inclusive of a bolt adjustable into and out of said annular groove to prevent or permit effective turning of the screw.

In witness whereof, I hereunto subscribe my name this 23rd day of May, A. D. 1921.

WILLIAM F. KRAUTTER.